March 27, 1962 P. F. MAEDER 3,026,731
MAGNETOHYDRODYNAMIC GYROSCOPE
Filed Aug. 30, 1960 2 Sheets-Sheet 1
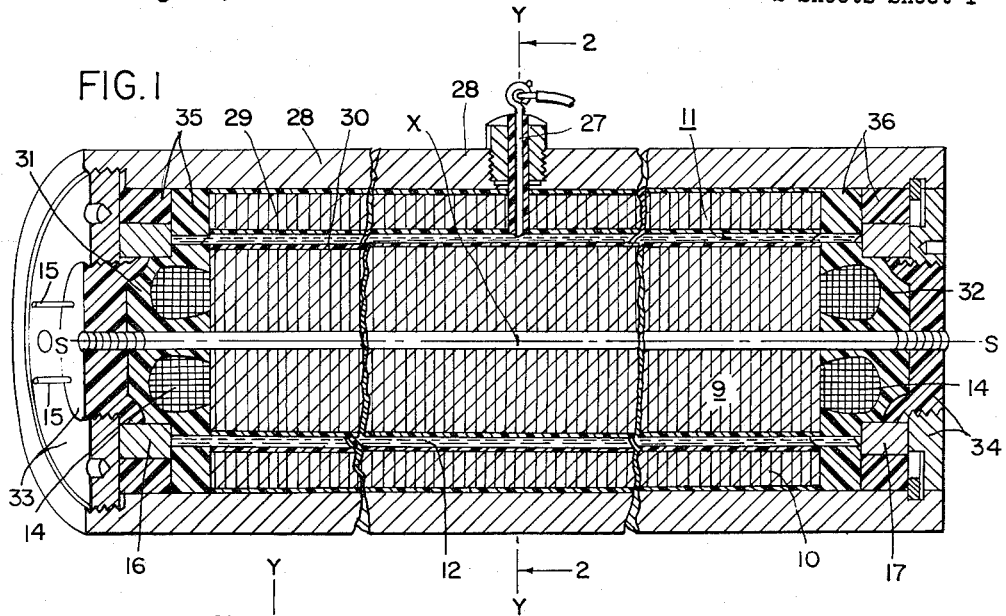
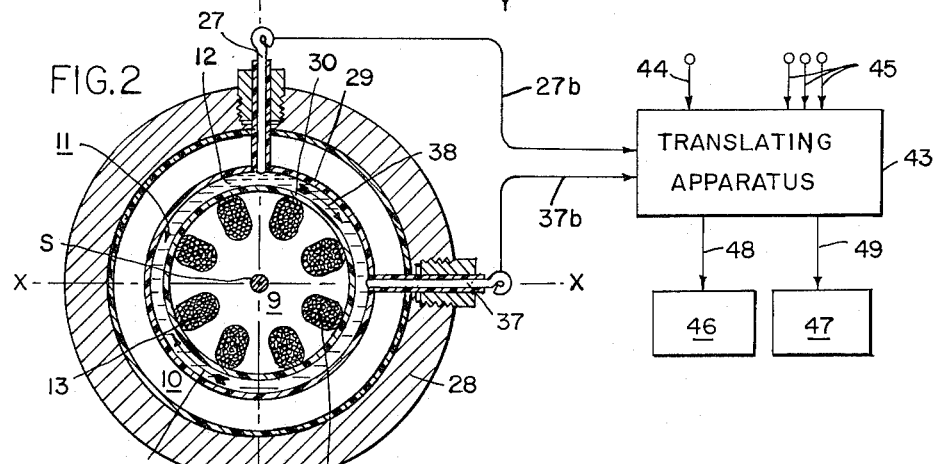
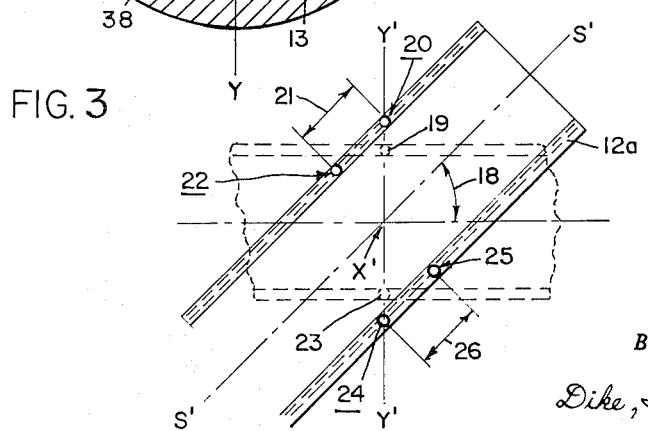
INVENTOR.
PAUL F. MAEDER
BY
Dike, Thompson & Bronstein
ATTORNEYS March 27, 1962 P. F. MAEDER 3,026,731
MAGNETOHYDRODYNAMIC GYROSCOPE
Filed Aug. 30, 1960 2 Sheets-Sheet 2
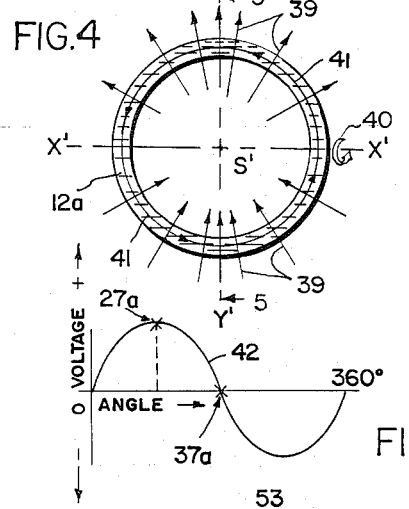
FIG.4
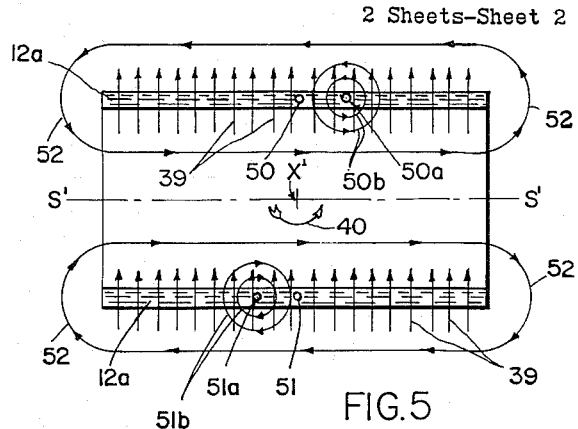
FIG.5
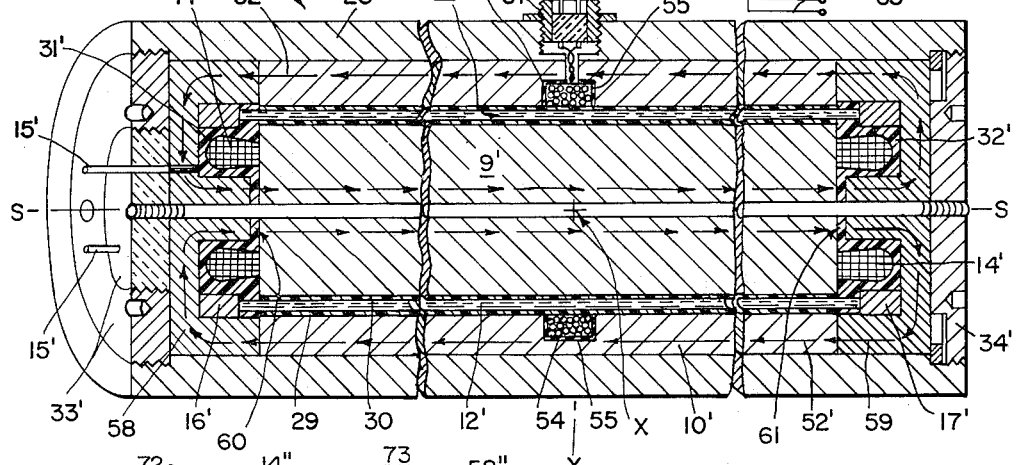
FIG.6
FIG.7
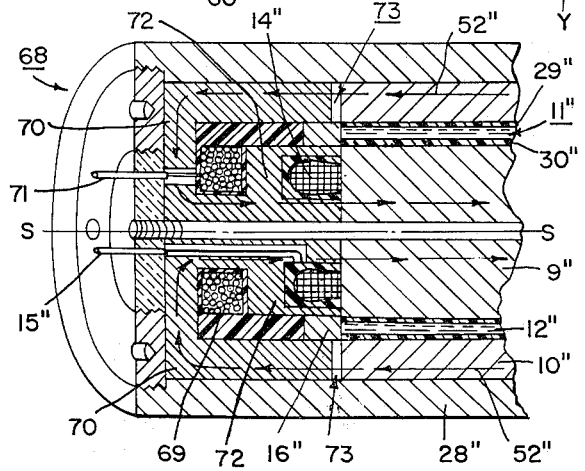
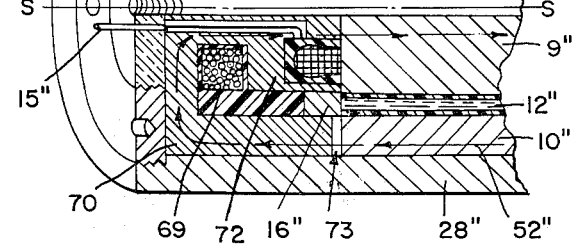
FIG.8
INVENTOR.
PAUL F. MAEDER
BY Dike, Thompson & Bronstein
ATTORNEYS

United States Patent Office

3,026,731
Patented Mar. 27, 1962

3,026,731
MAGNETOHYDRODYNAMIC GYROSCOPE
Paul F. Maeder, Rumford, R.I., assignor to Speidel Corporation, Providence, R.I., a corporation of Rhode Island
Filed Aug. 30, 1960, Ser. No. 52,991
19 Claims. (Cl. 74—5.7)

The present invention relates to inertial devices and, in one particular aspect, to improved gyroscopes of the type having electromagnetically-driven liquid rotors wherein electrical output signals characterizing angular movements about sensing axes are developed with high sensitivity in response to secondary liquid flow in directions out of correspondence with directions of spin.

In heretofore conventional forms, gyroscopes have included a relatively massive and precisely-balanced rotor which is mounted in a balanced gimbal and is rotated at high speed about a spin axis by electric or pneumatic motive equipment, the rotor in turn being suspended in a frame or further gimbal for relative movement about at least one further axis normal to the spin axis. Optimum performance is approached only through costly design and manufacture which are intended to minimize static weight, to reduce troublesome bearing frictions, and to compensate for static and dynamic imbalance, windage, and temperature-induced dimensional variations. A unique gyroscope construction which materially reduces or entirely avoids difficulties of such origins instead involves a confined electrically-conductive liquid as the sole rotating component, the liquid rotation which develops desired inertial characteristics being imparted by static electromagnetic structure. An annulus of liquid which is rotated in this manner possesses instantaneous inertial tendencies to persist in its spin about an axis fixed in spatial attitude while the supporting structure moves about a sensing axis normal to the spin axis. This characteristic has been exploited for measurement purposes, it being known that certain attendant pressure differences and variations in electrical resistance are representative of the instantaneous rates of turn about each sensing axis. However, it is found that if the axial length of the liquid annulus is increased, with the object of magnifying the measurement output signals, or if the overall size and mass are sought to be reduced by the most attractive expedient of decreasing the annulus diameter, the output signals tend to deteriorate rather than improve. According to the present invention, it is recognized that the failure to realize improvement through practice of the prior measurement techniques is primarily the result of secondary flow within the liquid annulus, i.e. certain flow which is out of correspondence with direction of spin, as the supporting structure moves about the sensing axes. Moreover, it is discovered that such secondary flow can instead uniquely provide the basis for new and highly advantageous electrical measurement of angular movements about the sensing axes, and the secondary flow is therefore intentionally promoted in constructions which yield increased sensitivity of output and/or miniaturization of the gyro structure.

It is one of the objects of the present invention, therefore, to provide improved gyroscopic apparatus having conductive liquid rotors which develop electrical output signals characterizing rates of turn in response to liquid flow out of correspondence with direction of liquid rotation.

A further object is to provide a sensitive magnetohydrodynamic gyroscope of simple and low-cost manufacture which generates accurate electrical output signals directly and thereby obviates the need for accessory pressure-sensing equipment.

Another object is to provide liquid-rotor gyroscopic apparatus which is sensitive in miniaturized forms and in which electric potential distributions and magnetic flux developed as the result of secondary liquid flow afford the bases for accurate and uncomplicated measurements of rates of turn about mutually perpendicular sensing axes.

By way of a summary account of practice of this invention in one of its aspects, I provide an electromagnetic stator assembly having concentric elongated magnetic core members separated by a thin radial gap through which an apparently-rotating radial magnetic field is produced by a distributed polyphase A.-C. electrical winding array associated with one of the core members. Electrically-conductive end closures at opposite axial ends of the radial gap serve as electrical busses for guiding the flow of eddy currents in preferred directions within liquid mercury filling the gap, such that efficient motor torques are produced within the mercury as the result of interactions between the applied radial magnetic field and the magnetic fields of the induced eddy currents. The motor torques rotate the elongated mercury annulus at speeds which occasion inertial tendencies for the mercury to persist in its rotation about a spin axis fixed in space, despite angular movements of the supporting stator assembly about sensing axes normal to the spin axis. Therefore, upon movement of the enclosing assembly about a sensing axis, and provided certain accommodating secondary flows of liquid are facilitated, there are, at times, significant relative axial movements between the liquid and the elongated enclosing assembly, and, consequently, cutting of the radial flux lines by the conductive liquid. Instantaneous electrical signals induced in the liquid in this manner are measured by electrical probes at positions angularly displaced by about 90 degrees about the central longitudinal axis of the assembly, these signals being of phase and amplitude characterizing the direction and rate of turn experienced about the sensing axis. These same induced signals develop ring-like electrical current flow patterns angularly about the axis of the liquid annulus, and the magnetic flux fields from such currents are separately measurable to characterize the direction and rate of turn in terms of electrical signals induced in an annular winding coaxial with the central longitudinal axis of the assembly. The mercury annulus is intentionally proportioned to have a substantial axial elongation, which promotes a secondary flow of mercury needed to accommodate material relative axial displacements between the stator and portions of the spinning mercury; for these purposes, the axial length of the annulus is not less than its diameter.

Although the features of this invention which are believed to be novel are set forth in the appended claims, the details of preferred embodiments of the invention and the further objects and advantages thereof may be readily comprehended through reference to the following description taken in connection with the accompanying drawings, wherein:

FIGURE 1 is a cross-sectioned side view of an improved magnetohydrodynamic gyroscope unit in which turns about sensing axes are characterized by A.-C. electrical signals generated within a conductive liquid annulus and measured by way of probe contacts;

FIGURE 2 is a transverse cross-section of the same gyroscope unit taken along section line 2—2 in FIGURE 1, together with associated electrical equipment, shown in block form, for resolving components of the electrical output signals and utilizing them for guidance purposes;

FIGURE 3 constitutes a schematic diagram illustrating the origins of important relative movements between the rotating liquid and its enclosure in a magnetohydrodynamic gyroscope;

FIGURE 4 presents a schematic illustration of instantaneous radial magnetic flux field distribution and ring current flow in a liquid annulus of a magnetohydrodynamic gyroscope;

FIGURE 5 presents a further schematic illustration, with reference to the liquid annulus as viewed along section line 5—5 in FIGURE 4, depicting the additional measurement flux field developed by ring current flow;

FIGURE 6 is a graphical representation of instantaneous potential distributions angularly about the central longitudinal axis of a magnetohydrodynamic gyroscope upon occurrence of turn about a sensing axis;

FIGURE 7 is a cross-sectioned side view of an improved gyroscope developing inductive output signals; and FIGURE 8 is a cross-sectioned side view of part of an improved magnetohydrodynamic gyroscope having inductive output winding provisions at one axial end thereof.

Having reference to the embodying equipment illustrated in FIGURES 1 and 2, it will be perceived that this includes a gyroscope assembly having inner and outer stacks of laminations of magnetic material, designated by reference characters 9 and 10, respectively, which are concentric about a central longitudinal axis S—S and which are radially separated by an annular gap 11. For the purpose of developing important motive effects with the liquid mercury 12 which fills the annular gap 11, the cylindrical inner lamination stack 9 cooperates with polyphase electrical windings 13 distributed in the manner of conventional alternating current motor stator windings and exhibiting the end turns 14 in the cross-sectioned view of FIGURE 1. These windings are excited by way of insulated electrical coupling connections 15, and the resulting alternating magnetic flux developed by the exciting windings 13 selects preferred low-reluctance flow paths including the material of both the inner and outer lamination stacks 9 and 10 and thereby traverses the annular gap 11 in substantially radial directions. Suitable alternating current excitation of the needed different phases may be derived from a polyphase source or through known phase-splitting circuitry associated with a single-phase source. In a known form of alternative stator construction, the distributed electrical windings may be associated with the outer lamination stack 10, rather than with the inner cylindrical lamination stack 9, with like results. Preferably, the dense electrically conductive liquid rotor annulus 12 is mercury, which is conveniently molten in the wide temperature range from −38.8° C. to +356.7° C., and eddy currents are induced within it by the applied radial magnetic flux field. In turn, the induced electrical currents in the liquid establish magnetic fields which interact with the applied fields to produce net torques upon the liquid annulus in one angular direction about the longitudinal spin axis S—S. Annular end conductors, or bus bars, 16 and 17 are in electrical contact with the mercury annulus at its two axial extremities, to promote circulation of the induced currents through preferred paths which improve the net torques experienced by the mercury. The resulting rotation of the mercury involves inertial tendencies for each unit volume thereof to rotate only in a plane normal to the spin axis, and to remain in such a plane of rotation despite transient angular movements of the confining structure about axes X—X and Y—Y normal to the spin axis. Accordingly, upon such angular movement of the confining structure, there is important attendant relative movement between the enclosure and the rotating liquid in axial directions in relation to the structure.

This relative movement may be better understood through reference to the schematic illustration of FIGURE 3 wherein an elongated spinning liquid annulus 12a is shown in cross-section at an instant when its spin axis S'—S' has just been displaced counterclockwise about the sensing axis X' by an angular amount 18 from its immediately prior orientation shown in dashed linework. A small centrally-located unit volume of liquid, 19, which had earlier been rotating in the plane of axis Y'—Y', normal to the spin axis, tends to remain in that same plane when the annulus is displaced by the angular amount 18, such that it occupies the position 20 in the full-line illustration. For this to have occurred, the unit volume of liquid must have been displaced axially by the amount 21 from the earlier centralized relative position 22, which amount represents the extent of flow in relation to the supporting enclosure (not there shown) during the time elapsed for the angular movement 18 to have taken place. At the diametrically opposite position, the comparable relative flow is in the opposite axial direction, with the initially-centralized unit volume of liquid 23 maintaining the position 24 in the plane of axis Y'—Y', such that it is displaced to the left of a centralized position 25 by the amount 26 equal to the amount 21. The axial ends of the annulus, being fixed by the enclosure, will not yield to accommodate such relative axial motion between the liquid and its enclosure at these ends, and it thus occurs that the flow there must be around the annulus to complete the flow loops including the aforesaid flows in the different axial directions at the diametrically opposite positions.

According to the present invention, the axial flow, rather than the spurious flows at the axial ends of the annulus, are important for measurement purposes, and it is for this reason that the liquid annulus is proportioned to have a substantial axial elongation and that electrical measurements are made about mid-way axially along the structure.

In FIGURE 1, the gyroscope assembly is shown broken away at two sections alongside the axial mid-position of section line 2—2, indicating that the axial elongation may be enlarged as needed. Insulated electrical probe 27 projects through the outer casing 28 and through the outer annular lamination stack 10 and its inner coating 29, at that position, and electrically contacts the mercury annulus 12 for measurement purposes. Preferably, the innermore end of probe 27 does not extend deeply enough into the rotating mercury to develop disturbing turbulences or drag, and it is sufficient that it merely make the desired electrical contact with the periphery of the annulus at a discrete position. In the latter connection, the insulating coating 29 advantageously tends to prevent leakage of certain currents through the lamination material, and thereby tends to keep the available electrical measurement signals, discussed later herein, at high levels. Coating 29, like the corresponding coating 30 on the exterior of inner lamination stack 9, preferably comprises a smooth sheathing layer of protective plastic material, such as an epoxy resin, which provides wanted electrical insulation of the mercury from the lamination material and which also insures that the enclosed mercury will not react with or leak between the laminations and will rotate with low losses along these smooth surfaces. Protective cast resin encapsulations 31 and 32 are likewise provided about the winding end turns 14, and these together with end closure members 33 and 34 and insulating spacers 35 and 36 complete the basic mechanical assembly. A second insulated electrical probe 37, comparable to the aforementioned probe 27, is oriented with a 90° displacement from probe 27 about axis S—S, as shown in FIGURE 2.

Polyphase motor excitation develops rotation of the mercury annulus in one angular direction about the axis S—S, as indicated by arrows 38 in FIGURE 2. The instantaneous radial magnetic flux field which is responsible for such rotation is of the directions and distributions characterized at one instant by the arrows 39 in FIGURE 4, the pattern being substantially sinusoidal, as in the case of an A.-C. motor field. This radial flux field is portrayed against the background of the mercury annulus 12a in which it develops the needed eddy currents having, in turn, attendant magnetic fluxes which react with the applied field to produce net propulsive forces upon the mercury in one angular direction about the axis S'. The direction of mercury rotation is the same as the direction of apparent rotation of the applied polyphase A.-C. field. Assuming a clockwise rotation in connection with FIGURE 4, therefore, the illustrated flux field pattern will be understood to shift in the clockwise direction also, at a speed synchronous with the excitation frequency.

Importantly, this same radial flux field, which produces the propulsive effects upon the liquid, can also serve to aid in generating the measurement output signals. As has been explained with reference to FIGURE 3, there is relative axial movement between the rotating mercury and the gyro assembly upon occurrence of turn about a sensing axis, and, inasmuch as the radial flux field is axially fixed in relation to the gyro assembly, there is likewise relative axial movement between the mercury and the lines of radial field flux at such times. The cutting of these lines of flux by the mercury at these times therefore induces currents and establishes potential gradients in the mercury. For an assumed angular movement 40 of the gyro assembly about the sensing axis X'—X', then, these induced currents must flow angularly about the annulus in the loop or ring path designated by the linework 41, at the instant considered in the FIGURE 4 illustration, and it is known that the induced E.M.F. then has a gradient, also angularly about the annulus, which will create these currents. This instantaneous potential gradient is represented by the generally sinusoidal waveform 42 in FIGURE 6, wherein the voltage is plotted against the corresponding angular positions fully around the central axis. The instantaneous electrical potentials then occurring at the sites of the aforementioned measurement probes 27 and 37 are shown in FIGURE 6 at the corresponding displaced angular positions 27a and 37a. From this plot, it is noted that there is an alternating potential at position 27a, but none at position 37a, and it is important to note that no measurement potential will be developed at position 37a of probe 37 for the condition of pure rotational movement only about its axis X'—X'. Instead, the characterizing measurement potentials are developed at the position 27a, with which the measurement probe 27 is aligned along the sensing axis Y'—Y', the latter also being normal to the gyro assembly spin axis S'. These measurement potentials detected by probe 27 are alternating potentials, of course, inasmuch as the radial field flux which is cut by the mercury in the generating process is an alternating flux. Amplitude and phase of the potentials at one of the probes characterizes the rate of turn and direction of turn, respectively, about the sensing axis which is normal to the axis of that probe. Therefore, the measurements at each of the two perpendicularly-oriented probes characterize any turn of the gyro assembly in terms of the components of turn about the two sensing axes. Where it is desired to characterize the turn further in terms of the components of turn about a third axis, mutually perpendicular to the other two, this may be done by orienting a second gyroscope assembly of similar construction with its spin axis normal to that of the first and with a sensing axis aligned with the spin axis of the first and with a measurement probe disposed normally to both the spin axis and sensing axis of the second gyroscope.

At any moment during which turn is experienced, the potentials detected by measurement probes 27 and 37 characterize the resolved vector components of the turn. In translating the potentials into meaningful outputs, each of the potentials is preferably related to a reference. This reference may conveniently comprise a ground level potential for the assembly, for example, and the average values of the A.-C. undulations in the potential differences between the reference potential and each of the probe potentials, then characterize the magnitude of the rates of turn about the appropriate axes. Sense, or direction, of each component of turn is conveyed by the phase of the A.-C. variations, the angular directions of each component of turn being signified by phases of the A.-C. variations which are displaced by 180 degrees. Therefore, a known form of discriminator-amplifier, of the type employed in servo systems for example, may be used in connection with each of the measurement signals to translate the measurement signals into output signals characterizing both the sense and magnitude of the rate of turn about a different one of the two sensing axis. The alternating current source of excitation for the motive windings 13 conveniently affords a form of reference the frequency of which is synchronously related to the frequency of undulations in the measurement signals, and outputs from this source may conveniently be applied as the required A.-C. excitations for the discriminator-amplifier circuits, with such phase-shifting circuitry interposed as may be desirable to synchronize the A.-C. variations in the discriminator-amplifier excitations with the measurement signals. In FIGURE 2, the arrangement for translating measurement signals from both probes 27 and 37 is of like character. Translating apparatus 43 there receives potentials from the probes by way of couplings 27b and 37b, respectively, and these are each compared with the level of a reference potential appearing at the coupling 44, which may introduce a ground level or other reference potential taken from the gyro assembly, for example. Couplings 45 also apply polyphase A.-C. signals, synchronized in frequency with the measurement signals, such as signals from the same source which excites the motor windings. Within the translating apparatus, each of the measurement signals is applied as the input of a different one of two known forms of discriminator-amplifier, and therefore causes rectified D.-C. output signals to be developed by it, the magnitude and polarity of which then characterize the rate and sense of turn, respectively, about a different one of the sensing axes. These output signals are applied to signal-utilizing devices 46 and 47 by way of couplings 48 and 49, respectively, and these devices may comprise the usual indicating instruments or automatic piloting or guidance equipment which respond to such measurement information for indication and/or control purposes. Although the translating apparatus may be of any suitable character producing the wanted output information, the embodiment including discriminator-amplifiers represents one suitable design, and, inasmuch as the two measurement signals derived from the perpendicularly-oriented probes are in a 90 degree time-phase displacement, the correspondingly-displaced signals across different pairs of the source leads 45 are conveniently used to derive the A.-C. excitations for the different discriminator-amplifiers. Both electrical probes are preferably disposed at the axial mid-position along the gyro assembly, where the aforementioned axial flow effects, and resulting potential gradients, are best related to the turns about the sensing axes. It is an important feature of this improved gyroscope arrangement that it affords simultaneous measurement of turns or components of turn about two sensing axes, without requiring either a like companion gyroscope or an auxiliary gimballing structure for measurements of turn about the second axis.

In connection with the FIGURE 4 illustration, it has been explained that ring currents 41 are generated within the mercury annulus 12a as the supporting gyro unit is turned about a sensing axis. The transverse view in FIGURE 5 shows the origins of these currents as the two diametrically-opposite unit volumes of mercury 50 and 51 are involved in relative axial movement to positions 50a and 51a, respectively, when the assembly has turned angularly counterclockwise about axis X'. Radial flux lines 39 are cut in the process, such that the described currents are induced and tend to circulate angularly about the central longitudinal axis S'—S'. In turn, the induced ring currents develop secondary magnetic fields, represented by the flux field lines 50b and 51b. Cumulatively, these secondary magnetic field lines produce a magnetic field having the general pattern indicated by lines 52.

Inasmuch as this secondary flux field travels in directions out of correspondence with the motive flux field developed by the motor windings 13, it can advantageously serve as a medium for conveying the measurement information, and this is the case with the gyroscope embodiments portrayed in FIGURES 7 and 8. According to this practice, output signals are induced in stationary electrical output windings, the actions being like those of a transformer wherein the mercury annulus conducting the ring currents corresponds to the primary while the output winding corresponds to the transformer secondary.

The FIGURE 7 apparatus includes a gyro unit 53 which entails many features having constructions and functions which are similar to those of the gyroscope of FIGURE 1 and, for convenience, the same reference numerals are employed as to these, together with distinguishing single-prime accents. This apparatus differs, however, in certain respects which reflect the differences in its generation of output signals responsive to the aforesaid axial flows of the mercury. For example, the inner and outer magnetic cores 9' and 10' are preferably of the known ferrite-core type wherein the magnetic reluctances in the axial directions are not excessively higher than in the radial directions; this is important because it is desired that the measurement flux field travel more readily in the axial directions than would be permitted by transversely-insulated laminations. Such cores nevertheless suppress eddy currents associated with the motive field flux, as is necessary for efficient operation. Also, at least one annular winding, 54, is disposed in inductive relationship with the primary formed by the mercury annulus 12'. As shown, this winding is relatively small, is recessed into the outer annular core 10' from the inner periphery thereof, is electrically isolated by insulation 55, and has its ends connected with terminal pins 56 of an electrical connector unit 57 fixed with the outer casing 28'. Axial length of the output winding 54 is intentionally made short, such that there is only inconsequential loss in motor action on the mercury due to the interruption of the outer core by the winding. Advantageously, the radial motor field flux is unable to induce any unwanted signals in the annular winding. Further, the axial ends of the gyro assembly are preferably shunted, in part, by bridge members 58 and 59, of magnetic material. These members aid in closing the measurement flux loops, such as those of flux loops 52 in FIGURE 5, and in establishing maximum flux linkages between the mercury annulus, as a primary, and the winding 54, as a secondary. The advantage of voltage step-up, which can appear in transformers, can also be realized within this gyroscope. Motor efficiency tends to be higher when the bridging members 58 and 59 are prevented from shunting excessive amounts of the motor field flux through them, and this may be accomplished by providing suitable insulation-filled magnetic gaps 60 and 61 in the flux paths through the bridging. Consequently, the radial field flux traverses annular gap 11', as intended. However, it should be understood that the motor flux field travels between poles which are angularly displaced about the central axis S—S, and that the magnetic bridging does not in any event act to divert the motor flux through the output winding in such a way as to create error signals. Certain amounts of bridging of the motor field at the ends of the assembly may therefore be tolerated, in the interest of securing lowered reluctance to flow of the measurement flux 52' through the same bridging members. A primary purpose of the gaps, such as 60 and 61, is also to impart thermal stability to the measurement flux paths. These gaps are of such width that temperature-induced dimensional variations will alter the magnetic reluctance of the measurement flux path only insignificantly, with the result that the temperature-responsive errors in the induced output signals are negligible. Such spurious signals as may be induced in the output winding 54 by the motor field are susceptible to cancellation by bucking with opposite signals derived from the polyphase excitation source for the motor windings, in accordance with known techniques.

The sinusoidal measurement signals induced in the output winding 54 in the manner described represent the vector resultant of two sinusoidal waves which are of the same frequency and are in quadrature relationship. One of these components is of amplitudes and of one or an opposite phase characterizing the magnitude and direction, respectively, of the rate of turn about sensing axis X—X in FIGURE 7. The other sinusoidal component is of amplitudes and of one or an opposite phase characterizing the magnitude and direction, respectively, of the rate of turn about sensing axis Y—Y. The resultant sinusoidal measurement signal appearing across terminals 56 is of amplitude and phase which identify the resultant turn vector in the plane of axes X—X and Y—Y, and, when desired, this information may be displayed by known forms of equipment which measure the peak amplitude and which measure the phase angle of the output signal in relation to one of the motor winding excitation signals, for example. Translating apparatus 62 may be of this character, with the reference A.-C. excitation signals being applied by way of leads 63. With both the amplitude and the phase angle of the vector measurement signal established, the two quadrature-related components thereof may be established by multiplication of the amplitude value by the sine and cosine functions of the measured phase angle. Translating apparatus 62 in this instance includes known forms of the required computer equipment for performing these operations, preferably involving the conversions of the amplitude and sine and cosine functions into related voltages, such that the output signals applied to signal utilization devices 64 and 65 through couplings 66 and 67 characterize the directions and rates of turns about different one of the two sensing axes. Utilizing signals from one phase of the A.-C. excitation leads 63 as a reference, for example, known electronic circuitry will directly resolve the A.-C. signal from winding 54 into a direct current signal the polarity and magnitude of which are representative of the direction and magnitude of the rate of turn about a sensing axis. Signal utilization devices 64 and 65 may serve either control or indicating purposes.

Gyro assembly 68, in FIGURE 8, represents a modification wherein a measurement output winding, 69, is disposed near an axial end of the elongated unit, rather than at a mid-position. In this figure, components which are of structure and function corresponding to those shown in FIGURES 1 and 7 are identified by the same reference numerals, with distinguishing double-prime accents added. Magnetic bridging member 70 is there constructed to accommodate annular output winding 69 about its center leg, where it is in the desired inductive relationship with the primary formed by the rotating mercury annulus 12. Pin connections, such as terminal 71, couple the winding output to suitable translating and control or indicating apparatus. Where a high degree of isolation from the end turns 14 of the motive windings is wanted, the closed magnetic shielding afforded by branch 72 of the bridging member is an aid. Gap 73 preserves a desirable isolation from the effects of unwanted thermally-induced dimensional variations in the magnetic circuitry. The position and distribution of the output winding may also be varied in other embodiments, an example of which is found in the case of a single-layer helical coil wound about the periphery of the cylindrical inner stator core and suitably protected by a sheath of plastic or other insulation.

Gyroscopes of the aforesaid construction possess operating characteristics permitting them to be miniaturized without disproportionate loss in sensitivity. The relative axial flow of liquid, which develops the useful electrical and magnetic phenomena, is particularly pronounced when the axial length of the gyro annulus is large in relation to its diameter. Accordingly, the diameters of such assemblies may be of small size, and the axial lengths may be as large as is convenient, whereas in hydro-dynamic gyroscopes operating with pressure-sensitive transducers the annulus diameter should not be reduced below about one-half the axial length thereof if sensitivity is not to be sacrificed.

Apparatus responsive to rate of angular movement in accordance with these teachings may assume configurations other than that of the cylindrical design illustrated, and, where desirable for simultaneous measurements about additional axes, a further gyro unit may be directly attached to or may have certain parts made integral with those of the other gyro unit. The apparently-rotating magnetic field flux may of course be created by polyphase excitations other than two-phase excitations, and with appropriate known winding interconnections. Moreover, the desired motive effects which rotate the conductive liquid may be produced in other ways, as by known stationary electromagnetic structure which not only involves the application of a magnetic field but the simultaneous forcing of current through the liquid from an outside source as well.

It should therefore be understood that the specific embodiments of this invention herein disclosed are of a descriptive rather than a limiting character and that various changes, combinations, substitutions, or modifications may be effected in accordance with these teachings without departing in spirit or scope from this invention in its broader aspects.

What I claim as new and desire to secure by Letters Patent of the United States is:

1. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including winding means directing magnetic field flux through said liquid substantially radially in relation to said spin axis, and electrical output means producing electrical output signals responsive to the electrical signals induced in said liquid by relative movement between said radial flux and said liquid in axial directions relative to said spin axis.

2. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including winding means directing magnetic field flux through said liquid substantially radially in relation to said spin axis, whereby upon angular movement of said structure about an axis normal to said spin axis the radial field flux is moved axially in relation to the spinning liquid and induces in said liquid electromotive forces which develop currents flowing in said liquid angularly about said spin axis, and electrical output means fixed with said structure producing electrical output signals characterizing said angular movement responsive to said electromotive forces induced in said liquid.

3. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including alternating current winding means directing polyphase alternating magnetic field flux through said liquid substantially radially in relation so said axis and with apparent rotation in one angular direction about said axis, and electrical output means producing alternating current output signals responsive to the electrical signals induced in said liquid by relative movement between said alternating magnetic flux and said liquid in axial directions relative to said spin axis.

4. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including alternating current winding means directing polyphase alternating magnetic field flux through said liquid substantially radially in relation to said axis and with apparent rotation in one angular direction about said axis, electrical output means producing alternating current output signals of the same periodicity as said polyphase field flux responsive to alternating current signals induced in said liquid by relative movement between said alternating magnetic flux and said liquid in axial directions relative to said spin axis, and translating means responsive to said output signals characterizing the direction and magnitude of rate of angular movement of said structure about a sensing axis normal to said spin axis in accordance with the phase and amplitude, respectively, of the component of said alternating current electrical signals which is induced in said liquid by said angular movement about said sensing axis.

5. Apparatus responsive to angular movement as set forth in claim 4 wherein said translating means includes means simultaneously characterizing the directions and magnitudes of rates of angular movement of said structure about two sensing axes both normal to said spin axis and to each other in accordance with the phases and amplitudes, respectively, of different ones of the two components of said alternating current electrical signals which are induced in said liquid by said angular movement about each of said sensing axes.

6. Apparatus responsive to angular movement comprising a structure having a liquid-tight hollow annular chamber therein, an electrically conductive liquid filling said chamber to form a liquid annulus, stationary electromagnetic means fixed with said structure in electromagnetically interacting relationship with said liquid developing liquid-accelerating torques rotating said liquid about a central axis of said annulus and including winding means directing magnetic field flux substantially radially through said annulus, and electrical output means producing electrical output signals responsive to the electrical signals induced in said liquid by relative movement between said radial flux and said liquid in axial directions parallel with said axis upon occurrence of angular movement of said structure about a sensing axis normal to said central axis.

7. Apparatus responsive to angular movement comprising a structure having a liquid-tight hollow annular chamber therein, an electrically conductive fluid filling said chamber to form a liquid annulus, electrical motive means consisting of stationary parts rotating said annulus about a central axis, said motive means including alternating current electromagnetic means directing apparently-rotating alternating magnetic flux substantially radially through said liquid annulus and inducing electromotive forces in said liquid which develop currents flowing angularly about said axis upon occurrence of relative axial movement between said flux and liquid, and electrical output means fixed with said structure producing electrical output signals responsive to said electromotive forces, whereby said electrical output signals characterize angular movements of said structure about at least one sensing axis normal to said central axis.

8. Apparatus responsive to angular movement comprising a structure having a liquid-tight and axially elongated hollow annular chamber therein, an electrically conductive liquid filling said chamber and forming a liquid annulus, said structure including an annular core of magnetic material and a coextensive substantially cylindrical inner core of magnetic material disposed coaxially outside and inside, respectively, of said liquid annulus, a pair of electrically conductive busses disposed one at each axial end of said annulus in electrical contact with said liquid, insulation means electrically insulating said conductive liquid from inner and outer surfaces, respectively, of said annular and cylindrical cores, electrical winding means excited with alternating current and directing apparently-rotating alternating magnetic flux substantially radially through said liquid annulus between said cores, electrical output means producing alternating current output signals responsive to alternating electromotive forces induced in said liquid by relative axial movement of said liquid and the radial magnetic flux upon occurrence of angular movement of said structure about a sensing axis normal to the longitudinal axis of said annulus, and translating means responsive to said output signals characterizing the direction and magnitude of rate of said angular movement in accordance with the phase and amplitude, respectively, of the component of said alternating current electromotive forces which is induced in said liquid by said angular movement about said sensing axis.

9. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including winding means directing magnetic field flux through said liquid substantially radially in relation to said spin axis, at least one electrical probe contacting said liquid at substantially one angular position about said axis and electrically tapping the potentials induced in said liquid by relative movement between the radial flux and said liquid in axial directions relative to said spin axis, and means comparing the potentials tapped by said probe with an electrical reference to develop electrical output signals characterizing rate of angular movement of said structure about a sensing axis which is normal to said spin axis and is angularly displaced from said probe about said spin axis.

10. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including winding means directing alternating magnetic field flux through said liquid substantially radially in relation to said spin axis, a pair of electrical probes each contacting said liquid at a different one of two angular positions angularly displaced by substantially 90 degrees about said spin axis and each electrically tapping alternating current potentials induced in said liquid by relative movement between said radial flux and said liquid in axial directions relative to said spin axis, and means comparing the potentials tapped by each one of said probes with another electrical signal as a reference to develop electrical output signals each characterizing rate of angular movement of said structure about a different sensing axis which is normal to said spin axis and is angularly displaced substantially 90 degrees from a different one of said probes.

11. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including winding means directing alternating magnetic field flux through said liquid substantially radially in relation to said spin axis, a pair of electrical probes each contacting said liquid at a different one of two angular positions angularly displaced by substantially 90 degrees about said spin axis and each electrically tapping alternating current potentials induced in said liquid at the position thereof by relative movement between said radial flux and said liquid in axial directions relative to said spin axis, and electrical translating means responsive to the potentials tapped by said probes producing electrical output signals characterizing rate of angular movement of said structure about axes normal to said spin axis.

12. Apparatus responsive to angular movement comprising a structure having a liquid-tight and axially elongated hollow annular chamber therein, an electrically conductive liquid filling said chamber and forming an elongated liquid annulus, said structure including magnetic core material extending coaxially inside and outside of said liquid annulus, a pair of electrically conductive contacts disposed one at each axial end of said annulus in contact with said liquid, insulation means electrically insulating said conductive liquid from said magnetic core material, electrical winding means excited with alternating current and directing apparently-rotating alternating magnetic flux substantially radially through said liquid annulus, at least one electrical probe contacting said liquid at substantially a mid-position axially along the periphery of said annulus and at substantially one angular position about the central longitudinal axis of said annulus and electrically tapping the alternating potentials induced in said liquid by relative movement between the radial alternating flux and said liquid in axial directions relative to said axis, means electrically insulating said probe from said structure, and means comparing the potentials tapped by said probe with an electrical reference to develop electrical output signals characterizing the direction and magnitude of rate of angular movement of said structure about a sensing axis substantially normal to said central axis and displaced substantially 90 degrees from said probe about said central axis.

13. Apparatus responsive to angular movement comprising a structure having a liquid-tight and axially elongated hollow annular chamber therein, liquid mercury filling said chamber and forming an elongated liquid mercury annulus, said structure including an outer annular core of magnetic material and a coextensive inner and substantially cylindrical core of magnetic material disposed coaxially outside and inside, respectively, of said mercury annulus, a pair of electrically conductive busses disposed one at each axial end of said mercury annulus in electrical contact with said mercury, electrical insulation means insulating the inner and outer peripheries of said annulus from the magnetic material of said cores, electromagnet winding means mounted with one of said cores and excited by polyphase alternating current signals to direct apparently-rotating alternating magnetic flux substantially radially through said mercury annulus between said cores, said magnetic flux generating eddy currents within said mercury and directed by said busses through said mercury in directions to develop net torques rotating said mercury in one angular direction within said annular chamber about a spin axis, the radial magnetic flux also inducing electromotive forces in said liquid which develop current flow in said liquid angularly about said spin axis, a pair of electrical probes mounted on said structure each contacting said liquid substantially mid-way axially along the periphery of said annulus and at a different one of two angular positions angularly displaced from one another by substantially 90 degrees about said spin axis, and means electrically insulating said probes from one another and from electrically conductive materials of said structure, each one of said probes producing alternating electrical output potentials the phase and amplitude of which characterize the direction and magnitude, respectively, of rate of angular movement of said structure about a different sensing axis normal to said spin axis and angularly displaced substantially 90 degrees from a different one of said probes about said spin axis.

14. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber about a spin axis and including winding means directing magnetic field flux through said liquid substantially radially in relation to said spin axis, whereby upon angular movement of said structure about an axis normal to said spin axis the radial field flux is moved axially in relation to said liquid in said chamber and induces in said liquid electromotive forces which develop currents flowing in said liquid angularly about said spin axis, electrical winding means fixed with said structure in position to intercept magnetic flux developed by said currents and thereby to have electrical output signals induced therein, said electrical output signals characterizing said angular movement of said structure.

15. Apparatus responsive to angular movement comprising a structure having a hollow liquid-tight chamber therein, an electrically conductive liquid within said chamber, stationary electromagnetic means fixed with said structure in electromagnetically interacting relationship with said liquid developing liquid-accelerating torques rotating said liquid within said chamber to develop inertial tendencies of said liquid to persist in rotation about a spin axis and including winding means directing alternating magnetic field flux through said liquid substantially radially in relation to said spin axis, whereby upon angular movement of said structure about a sensing axis normal to said spin axis the radial flux is moved axially in relation to said liquid in said chamber and induces in said liquid alternating currents flowing angularly about said spin axis, electrical winding means electrically insulated from said liquid and having turns substantially normal to and intercepted by lines of magnetic flux developed by said induced alternating currents, said electrical winding means producing alternating current electrical output signals characterizing said angular movement of said structure.

16. Apparatus as set forth in claim 15 wherein said winding means directing alternating magnetic field flux substantially radially through said liquid comprises polyphase windings excited by substantially sinusoidal polyphase alternating currents and developing apparently-rotating substantially sinusoidal magnetic field flux the pattern of which shifts angularly about said spin axis to produce said liquid-accelerating torques, whereby said alternating current output signals are substantially sinusoidal and of frequency synchronous with the speed of rotation of said apparently-rotating magnetic field flux, whereby the amplitude and the phase angle of said output signals in relation to said polyphase alternating currents respectively characterize magnitude and direction of the vector resultant of the rate of turns of said structure having turn vectors lying in a plane perpendicular to said spin axis, and signal utilizing means responsive to said output signals characterizing the direction and magnitude of rate of angular movement of said structure.

17. Apparatus responsive to angular movement comprising a structure having a hollow liquid-tight annular chamber therein, an electrically conductive liquid filling said chamber and forming a liquid annulus, stationary electromagnetic means fixed with said structure in electromagnetically interacting relationship with said liquid developing liquid-accelerating torques rotating said liquid annulus about a central longitudinal axis and including winding means directing magnetic field flux substantially radially through said liquid annulus, said electromagnetic means including core members of magnetic material extending coaxially inside and outside of said liquid annulus, bridging means of magnetic material near both axis ends of said structure providing low-reluctance paths for flow of magnetic flux between said core members, and electrical output winding means inductively coupled with said liquid annulus through said magnetic material, whereby angular movement of said structure about a sensing axis normal to said spin axis moves the radial flux axially in relation to said liquid in said annular chamber and induces in said liquid currents flowing angularly about said axis, said electrical output winding means producing electrical output signals characterizing said angular movement of said structure.

18. Apparatus as set forth in claim 17 wherein said winding means directing magnetic field flux substantially radially through said liquid annulus produces alternating magnetic flux and wherein said currents and output signals alternate at the periodicity of said alternating flux, wherein said bridging means include at least one narrow high-reluctance gap interrupting said paths, and wherein said electrical output winding means comprising an annular winding encircling said central axis to intercept alternating magnetic flux developed by said currents flowing angularly about said axis.

19. Apparatus responsive to angular movement comprising a structure having a hollow liquid-tight annular chamber therein, liquid mercury filling said chamber and forming a liquid mercury annulus, substantially annular outer and substantially cylindrical inner core members of magnetic material extending coaxially outside and inside, respectively, of said mercury annulus, a pair of electrically conductive busses disposed one at each axial end of said annulus in electrical contact with said liquid mercury, electrical winding means supported by at least one of said cores excited by polyphase substantially sinusoidal alternating currents and directing an apparently-rotating magnetic field flux substantially radially through said mercury annulus which interacts with said mercury and develops net torques rotating said mercury in one angular direction about the central longitudinal axis of said annulus, bridging means of magnetic material across the axial ends of said cores providing low-reluctance paths for circulation of magnetic flux in axial directions through said cores, electrical output means including an annular winding encircling said axis in inductive relationship with said mercury annulus, whereby angular movements of said structure about two mutually perpendicular sensing axes normal to said central axis moves the radial flux axially in relation to the mercury in said annular chamber and induces in said mercury annulus alternating currents flowing angularly about said central axis, the induced alternating currents in said annulus producing alternating magnetic flux circulating in said axial directions through said cores and inducing substantially sinusoidal electrical output signals in said annular winding the amplitude and phase of which represent the resultant of two components of said signals developed responsive to said angular movements of said structure about said two sensing axes, and translating means resolving said electrical output signals into two alternating current signals the phase and amplitude of which characterize the direction and magnitude of rate of angular movement of said structure about different ones of said sensing axes.

References Cited in the file of this patent

UNITED STATES PATENTS

| | | |
|---|---|---|
| 2,099,593 | Bender et al. | Nov. 16, 1937 |
| 2,716,943 | Vandenberg | Sept. 6, 1955 |
| 2,949,784 | Maeder | Aug. 23, 1960 |